United States Patent [19]

Vig

[11] 4,123,039
[45] Oct. 31, 1978

[54] RAISE-LOWER DEVICE

[75] Inventor: Satinder K. Vig, Edinboro, Pa.

[73] Assignee: American Sterilizer Company, Erie, Pa.

[21] Appl. No.: 754,937

[22] Filed: Dec. 28, 1976

Related U.S. Application Data

[63] Continuation of Ser. No. 593,002, Jul. 3, 1975, abandoned.

[51] Int. Cl.² ............................................. B66B 11/04
[52] U.S. Cl. .................................................. 254/9 C
[58] Field of Search ............... 254/122, 9 C, 126, 124; 187/18; 182/115; 214/512

[56] References Cited

U.S. PATENT DOCUMENTS

| | | | |
|---|---|---|---|
| 1,545,223 | 7/1925 | Westrate | 254/126 |
| 2,625,443 | 1/1953 | Sensenbaugh | 254/124 |
| 3,486,583 | 12/1969 | Wiklurd | 187/18 |

*Primary Examiner*—Robert C. Watson
*Attorney, Agent, or Firm*—Charles L. Lovercheck

[57] ABSTRACT

A vehicle and a platform and means for lifting said platform relative to said vehicle. Lifting mechanism comprising four pairs of linkages, each defining isosceles triangles placed longitudinally on top of said vehicle and defining the shape of said platform. Front, intermediate and rear balance linkages connecting the upper ends of the links of the four pairs of linkages by common lateral connecting rods. The pairs of isosceles triangles being clevace mounted to the top of a ball bearing actuator nut assembly driven by a 12 volt motor through a central bar that is fastened on each end to the right and left-hand linkages assemblies; and limit switches to control the upward and downward movement of the platform.

4 Claims, 6 Drawing Figures

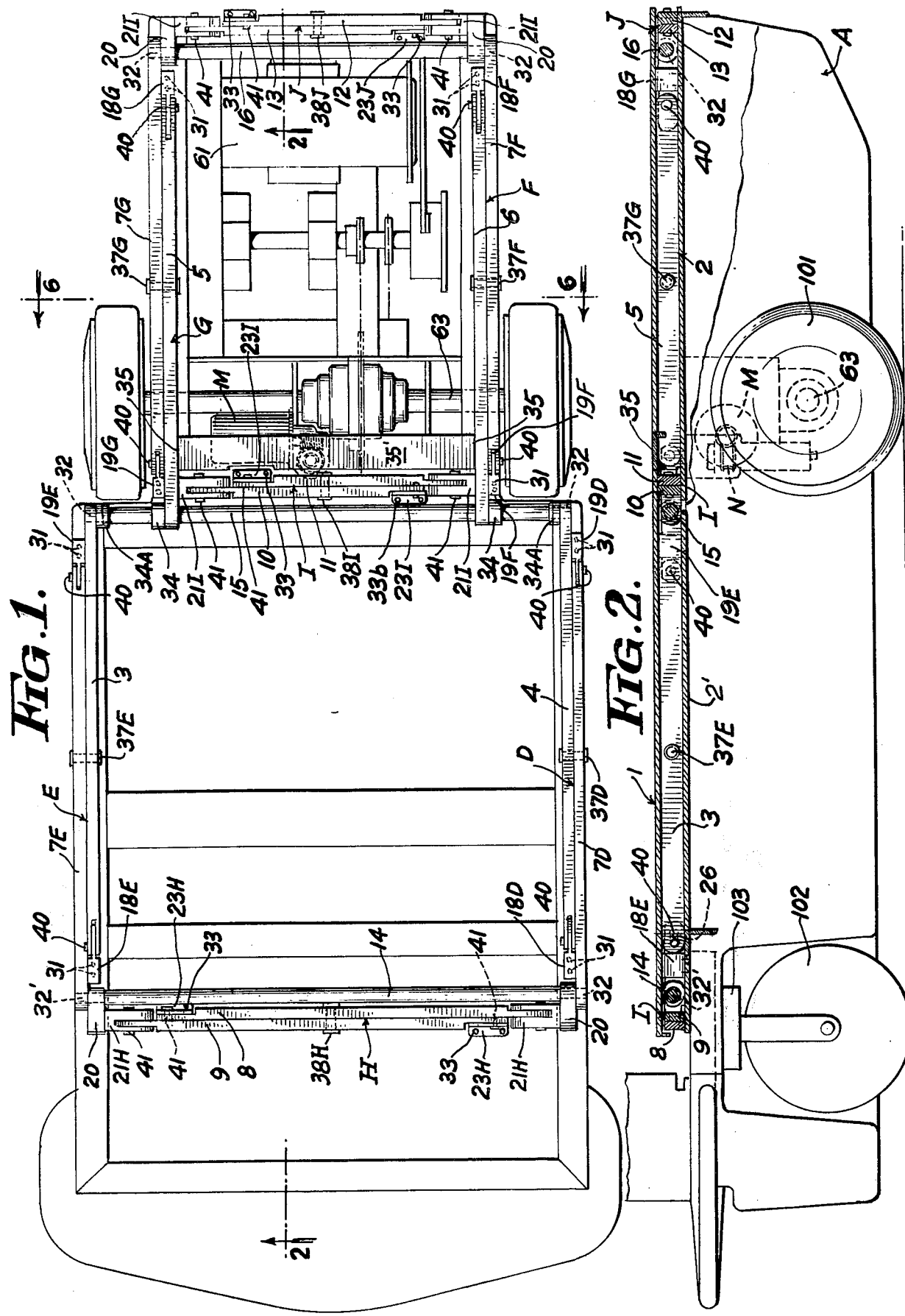

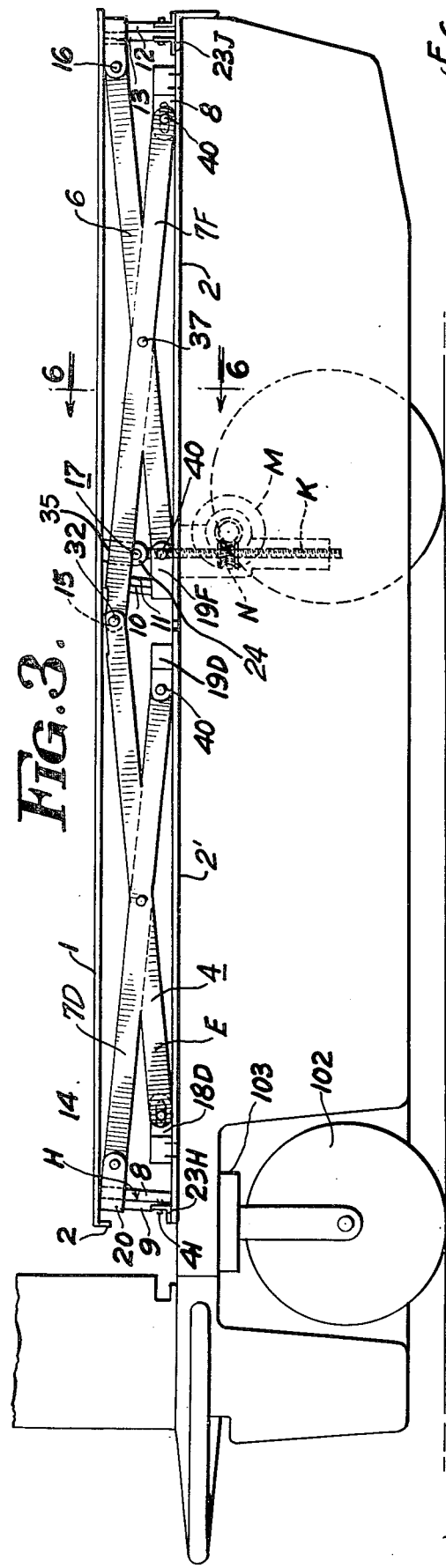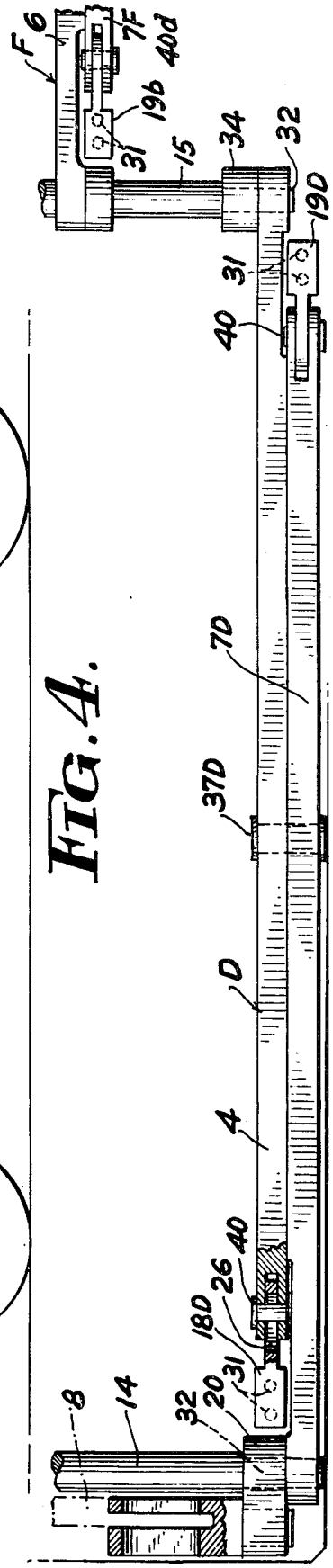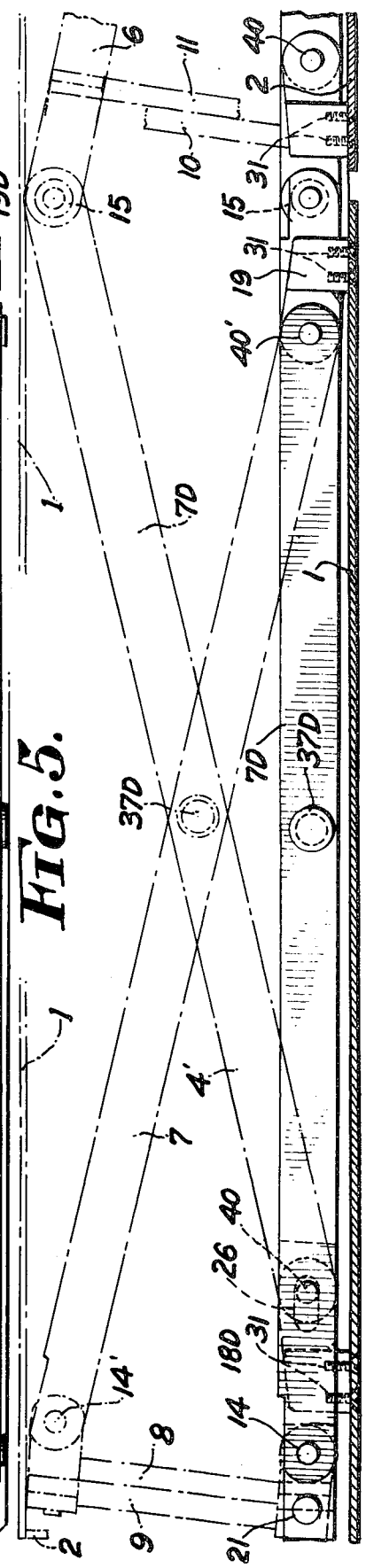

RAISE-LOWER DEVICE

This is a continuation, of application Ser. No. 593,002 filed July 3, 1975, now abandoned.

GENERAL STATEMENT OF INVENTION

The car deck cover and the module base are especially designed to interface with the raise-lower mechanism. The isosceles triangels control the platform to move upward and downward in translation relative to the car and an electrical circuit is provided with a motor that rotates the actuator screw. The screw-nut assembly converts the rotary motion into linear motion. This in turn raises the lift bars. Since the lift bar is connected to the nut assembly and also fastens to the right-hand and left-hand linkages, the linkage bars above the hinged points move upward along a narrow arc, thus providing the desired lift. The linkage bars below the hinge points either slide on a guided pin and slot arrangement or swing on an arc on the fixed pin connection. Upward direct-linear movement of the top link bars is controlled by limit switches adjacent to the moving nut assembly to control the maximum height movement of the platform. Suitable limit switches are provided to stop the motor when the desired height is reached. The lateral linkage assembly top bars, also move up with the rest of the system, thus providing a rigid and stable load carrying platform.

OBJECTS OF THE INVENTION

It is an object of the invention to provide an improved lifting mechanism for a car platform.

Another object of the invention is to provide a lifting mechanism for a car platform that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF DRAWINGS

FIG. 1 is a top view of the lifting mechanism according to the invention.

FIG. 2 is a longitudinal cross sectional view taken on line 2—2 of FIG. 1.

FIG. 3 is a side view of the lifting mechanism.

FIG. 4 is a partial enlarged top view of a part of the lifting mechanism.

FIG. 5 is a partial side view of the part of the invention shown in FIG. 4.

REFERENCE TO PRIOR ART

Figure 6:
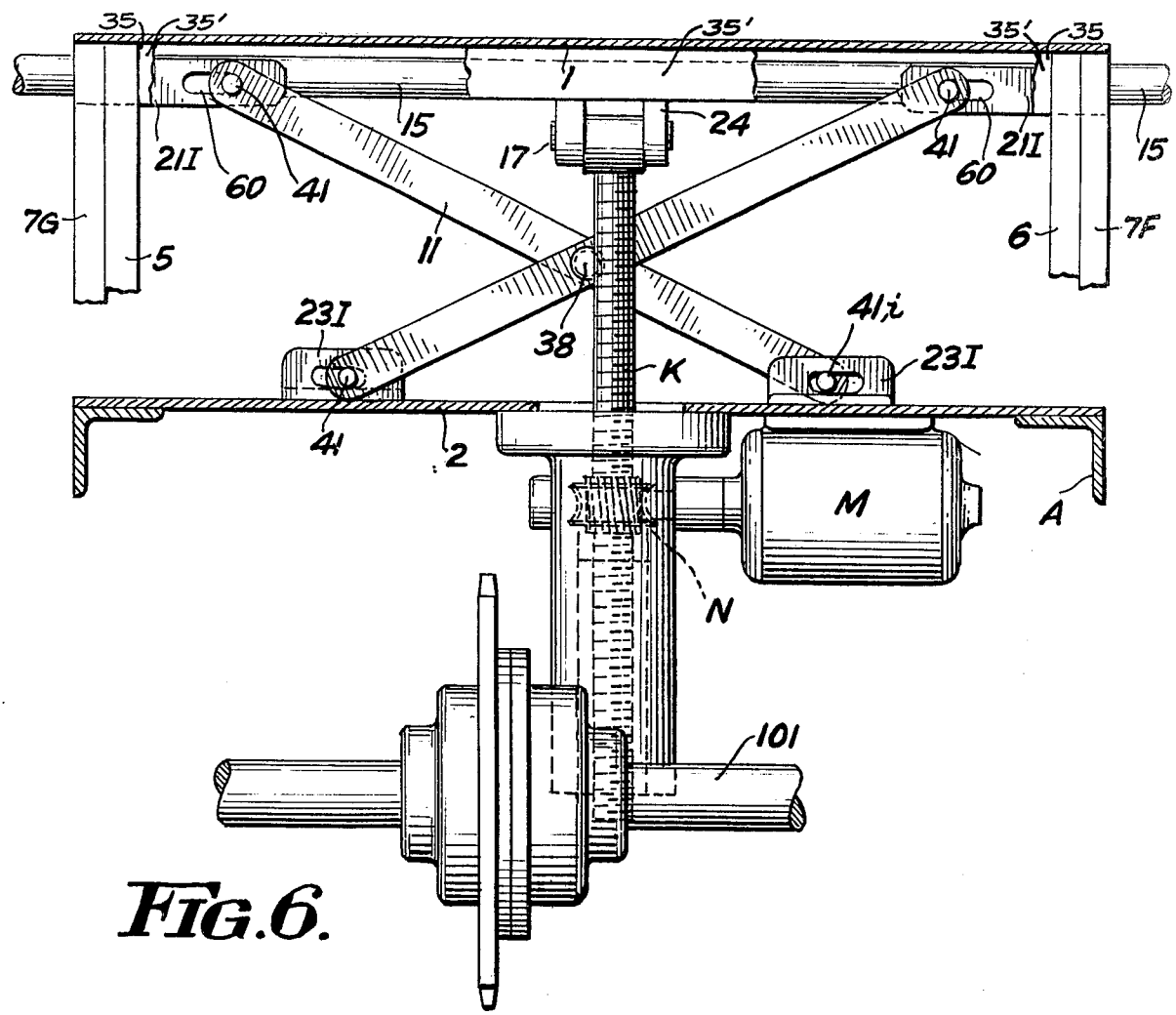
FIG. 6 is a cross sectional view on line 6—6 of FIG. 2.

The lifting mechanism disclosed herein is intended to be used on a car and is a lifting mechanism of the type shown in U.S. Pat. No. 3,648,869.

DETAILED DESCRIPTION OF DRAWINGS

Now with more particular reference to the drawings, the combination of a lifting mechanism made up of a motor M and the linkage assembly and the platform 1, on upper plate-like member 2 and a longitudinally and co-extending lower plate-like member 2. The two plate members being spaced apart vertically and supported on Frame A. The raise and lower device disclosed herein includes, in combination, the vehicle Frame A, having wheels 101 and 102 and two sets of lazytong linkage assemblies E and G on one side of the Frame and D and F on the other side of the Frame. The linkage assemblies are made up of several link members connecting the supporting Frame A and the plate-like members 2. The device also has similar linkages H, I, and J on the two ends and intermediate portions connecting the plate-like members to the vehicle Frame A. The linkage assemblies cooperate to move up and down in plane in a rectangular pattern to raise and lower the platform with respect to vehicle frame. Each linkage is made up of a first link 7D, 7E, 7F, and 7G and a second linkage made up of links 3, 4, 5 and 6 pivoted together at a point intermediate between their respective ends. Means are provided for pivotally and slidingly connecting the lower and upper ends of the first links 7D, 7E, 7F and 7G to the platform and frame by pins and holding blocks and pivotally connecting the second links 3, 4, 5 and 6 to the platform and to the frame by pins and holding blocks. The connecting means connecting the first link to the platform and frame are such that the end of the first 7D, 7E, 7F and 7G swing about their pivot point 40 while the lower ends of the links 3, 4, 5, and 6 slid in the slotted holding blocks 18D, 18E, 18F and 18D. The first links 7D, 7E, 7F and 7G are connected to the frame by holding blocks 19D, 19E, 19F and 19G in non-sliding relation and to the platform at 32 as explained later herein.

The linkage E is made up of the inside of front right hand linkage bar 3 and the front right-hand outside linkage bar 7E pivotably connected at their midpoints at 37E.

The linkage D is made up of the front inside linkage bar 4 and the front outside linkage bar 7D, pivotably connected at their midpoints by pivot 37D.

The rear right-hand linkage G is made up of the inside front right-hand linkage bar 5 and the rear right-hand linkage bar 7G pivotably connected together at their midpoints by pivot 37G.

The linkage F is made up of the rear inside linkage bar 6 and the rear outside linkage bar 7F.

The balancing linkages are made up of front balancing linkage H, intermediate balancing links I, and rear balancing linkage J. The linkage H is made up of linkage bars 8 and 9 pivotably connected at their midpoints by pivot 38H. Linkage I is made up of links 10 and 11 pivotably connected together at their midpoints by pivot 38I. Linkage J is made up of links 12 and 13 pivotably connected at their midpoints by a pivot 38J.

The balance linkages H, I and J have their upper ends pivoted to the second ends of links 7E, 7D, 7F and 7G and the lower ends of the links 8, 9, 10, 11, 12 and 13 can slide relative to each other in their balance bar mounting supports 23H, 23I and 23J.

The lower ends of the bars 3, 4, 5, and 6 are swingably connected to the frame by sliding hold-down blocks 18D, 18E, 18F, and 18G. These blocks 18D through 18G are fixed to the frame A, and are pivot hold down blocks 19D, 19E, 19F, and 19G respectively. The sliding hold down blocks 18D through 18G each have a slot 26 which receives the pins 40 while the sliding hold downs 19D through 19G each have a hole that receives its pivot 40. The slot 26 allows the lower ends of the links to move toward and away from each other.

It will be noted that the sliding hold-down blocks 18D though 18G have a slot 26 in them in which pins 40 can slide, therefore, when links 3,4,5, and 6 swing up and down, their lower ends travel toward and away from 40. The hold-down blocks 19D through 19G have a pivot pin 40' which cannot slide in the bore they are in, therefore, links 7D, 7E, 7F, and 7G swing up and down about fixed pivots 40' and these pivots do not travel toward or away from each other.

When the lifting mechanism is in its lowered position, as shown in FIG. 5, the links are all disposed below a plane passing through their upper edge and the upper ends of the links all move upwardly in a plane. It will be noted that the platform 1 rests on the upper ends of the links.

The ends of the front connecting rod 14 are received in the holes in contact bar 20 and are pivotably received in the upper section ends of the link 7D and 7E.

The connecting rods 14, 15 and 16 hold the upper ends of the lateral linkages D and E and lateral linkages F and G in fixed spaced relation so that they move up and down in a plane and the upper ends of the links of the longitudinal linkage I is held so that their upper ends move up and down in a straight line.

The intermediate connecting rod 15 is pivoted to the second ends of the links 3, 4, and the links 5 and 6 holding them in fixed spaced relation to each other. The intermediate connecting rod 15 pivotably receives the second ends of the links 5 and 6 and is held against sliding outward thereon by the collars 34. Connecting rod 15 is also received in the upper ends of the links 3 and 4 and pinned to them by pins 32. The upper ends of the links 7F and 7G are pivoted to the outer ends of the rear connecting rod 16 and the contact bars 20 are also pivoted to the rear connecting rod 16. The outer reduced sized ends of connecting rod 14 extend through the contact bars 20 and through the upper ends of the links 7D and 7E. The contact bars 20 pivot on the connecting rods 14 and the links 7D and 7E are pinned to it by links 32.

The bifurcated mounting bars 21H are fixed to the contact bars 20 and links 8 and 9 have their upper ends received between the bifurcated arms of mounting bars 21H and are pivotably connected thereto by pins 41.

The lower ends of links 8 and 9 are supported on the slotted hold-down blocks 23H by pins 41. The ends of lift bar 35 are fixed to the inner edges of links 5 and 6 and lugs 24 are fixed to the central part of the underside of the lift bar 35 and pin 17 is rotatably received in lugs 24 and extends through screw K pivotally connecting the screw to the lugs 24.

It will be seen that when the nut N is rotated by the motor M and the screw K is thus moved up, the upper ends of links 3, 4, 5, and 6, which are connected to rod 15 will move up in a linear path, while the rod 15 rises vertically. The lower ends of links 3,4,5, and 6 will slide toward the center of the car. The upper ends of links 7D, 7E, 7F and 7G will move upward in an arcuate path about their pivot points 40 and the upper ends of the lateral linkage I will move upward in a vertical line, its lower ends carried by pins 41, will slide toward each other in slots 60. The upper ends of linkages H and J will move with the mounting supports 21H and 21I, respectively, while their lower ends will slide toward each other carried by their support pins 41.

The ends of the platform 1 rest on the contact bars 20 and on the collars 34, thus when the motor M is operated, the platform will move up and down in a vertical path.

The car can be driven over the floor by means of drive motor 61 which drives the wheels 101 through the axle 63.

Th foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a vehicle frame (A) and a lifting mechanism and a platform,
    said lifting mechanism comprising,
    a first plate-like member (2), and
    a second plate-like member (2'),
    said plate-like members being disposed in a common plane in end to end relation to each other and resting on said frame (A),
    said lifting mechanism comprising a first lifting linkage (D) and a second lifting linkage (E), a third lifting linkage (F) and a fourth lifting linkage (G),
    each said lifting linkage being made up of first links (7D, 7E, 7F and 7G) and second links (3, 4, 5 and 6), attached to said frame and to said plate-like member,
    each said first links being pivoted to a said second link adjacent their mid-points (37D, 37E, 37F and 37G) to swing relative to each other,
    the said links of each said first lifting linkage (D) and said second lifting linkage (E) having a first end swingably attached to said first plate-like member (2) and a second end supporting said platform (1),
    the said links of each said third lifting linkage (F) and said fourth lifting linkage (G) having their first ends swingably attached to said second plate-like member (2'),
    first front balance linkage means attached to said first plate-like member and connected to said first (D) and second (E) lifting linkages,
    an intermediate balance linkage means attached to said second plate-like member and to said first and second, lifting linkages,
    a rear balance linkage (J) connected to said second plate-like member and connecting said third (F) and fourth (G) lifting linkages to said second plate-like member (2'),
    a front connecting rod (14),
    an intermediate connecting rod (15) and a rear connecting rod (16),
    means connecting the ends of said front connecting rod (14) to said first balance linkage means (H) and to the second ends of said first links (3 and 4) of said first lifting linkages (D and E), holding said second end of said first links of said first lifting linkage and said second lifting linkage in fixed, spaced relation to each other,
    means connecting said intermediate connecting rod (15) to said intermediate balance linkage means (I) and to the second ends of the second links (5 and 6) of said first and second lifting linkages and to the second ends of the second links of said third lifting linkage and said fourth lifting linkage, and means connecting said rear connecting rod (16) to said rear balance linkage means (J) and to second ends of said first links (7F and 7G) of said third lifting linkage (F) and said fourth lifting linkage (G), holding said third lifting linkage and said fourth lifting linkage in fixed spaced relation to each other, lifting linkage means comprising, a lifting bar (35') having its end (35) fixed to said second end of said second links (5 and 6) of said third balance linkage means (F) and said fourth balance linkage means (G), said lifting means being supported on said frame and connected to the center of said lifting bar (35') for lifting said platform relative to said frame.

2. The combination recited in claim 1 wherein said balance linkage means comprises, a first balance linkage means (H), an intermediate balance linkage means (I), and a rear balance linkage means (J), said balance linkages (H, I, J) each having a first link (8, 10, 12) and a second link (9, 11, 13) pivotally connected together adjacent their mid-points, said links of said first balance linkage means having a first end swingably attached to said first plate-like member and a second end attached to an end of a link of said lifting linkages, said links of said intermediate balance linkage (I) and said second balance linkage (J) having their first ends swingably attached to said second plate-like member (2').

3. The combination recited in claim 2 wherein the said front connecting rod (14) is connected to the second ends of the second links of said intermediate balance linkage.

4. The combination recited in claim 2 wherein the ends of said intermediate connecting rod are connected to the second ends of said second links of said intermediate balance linkage means and to the second ends of the second links of said first lifting linkage.

* * * * *